(12) United States Patent
Koster et al.

(10) Patent No.: US 7,213,106 B1
(45) Date of Patent: May 1, 2007

(54) CONSERVATIVE SHADOW CACHE SUPPORT IN A POINT-TO-POINT CONNECTED MULTIPROCESSING NODE

(75) Inventors: Michael J. Koster, Freemont, CA (US); Brian W. O'Krafka, Austin, TX (US)

(73) Assignee: Sun Microsystems, Inc., Santa Clara, CA (US)

(*) Notice: Subject to any disclaimer, the term of this patent is extended or adjusted under 35 U.S.C. 154(b) by 288 days.

(21) Appl. No.: 10/914,373

(22) Filed: Aug. 9, 2004

(51) Int. Cl.
*G06F 13/00* (2006.01)

(52) U.S. Cl. ............... 711/119; 711/130; 711/133

(58) Field of Classification Search ......... 711/120, 711/119, 130, 133
See application file for complete search history.

(56) References Cited

U.S. PATENT DOCUMENTS

| | | | | |
|---|---|---|---|---|
| 6,018,763 A | * | 1/2000 | Hughes et al. ......... | 709/213 |
| 6,338,123 B2 | * | 1/2002 | Joseph et al. ......... | 711/144 |
| 6,792,512 B2 | * | 9/2004 | Nanda et al. .......... | 711/144 |
| 6,810,467 B1 | * | 10/2004 | Khare et al. .......... | 711/146 |
| 6,868,481 B1 | * | 3/2005 | Gaither et al. ........ | 711/119 |
| 6,959,364 B2 | * | 10/2005 | Safranek et al. ...... | 711/146 |

* cited by examiner

*Primary Examiner*—Hyung Sough
*Assistant Examiner*—Anton Rabovianski
(74) *Attorney, Agent, or Firm*—Osha Liang LLP

(57) ABSTRACT

A point-to-point connected multiprocessing node uses a snooping-based cache-coherence filter to selectively direct relays of data request broadcasts. The filter includes shadow cache lines that are maintained to hold copies of the local cache lines of integrated circuits connected to the filter. The shadow cache lines are provided with additional entries so that if newly referenced data is added to a particular local cache line by "silently" removing an entry in the local cache line, the newly referenced data may be added to the shadow cache line without forcing the "blind" removal of an entry in the shadow cache line.

20 Claims, 12 Drawing Sheets

CONSERVATIVE SHADOW CACHE SUPPORT IN A POINT-TO-POINT CONNECTED MULTIPROCESSING NODE

BACKGROUND OF INVENTION

As shown in FIG. 1, a typical computer system 10 includes at least a microprocessor 12 and a main memory 14. The main memory 14 contains data for use by the microprocessor 12 to perform the operations of the computer system 10. However, because the speed of the microprocessor 12 is typically significantly faster than that of the main memory 14, memory of smaller size and faster speed (referred to and known as "cache" memory) is often implemented to allow the microprocessor 12 to access frequently and/or recently requested data faster than it would otherwise take to obtain such data from the main memory 14.

Still referring to FIG. 1, the microprocessor 12 has an "on-chip" (i.e., on the same semiconductor die as the microprocessor 12), or "L1," cache memory 16 and an "off-chip," or "L2," cache memory 18. When the microprocessor 12 requests data, a cache controller 20 causes the L1 cache memory 16 to be searched for the requested data, and if that search does not "hit" (i.e., a cache "miss" occurs), the L2 cache memory 18 is searched for the requested data. If the requested data is not found in the cache memories 16, 18, the requested data is retrieved from the relatively slow main memory 14.

Those skilled in the art will recognize that a microprocessor may have any number of cache memory levels, which are typically referred to by number in order of decreasing proximity to the microprocessor. Further, those skilled in the art will recognize that any number of cache memories may be on-chip and any number of cache memories may be off-chip.

A computer system, like the one shown in FIG. 1, may be used as a system that services requests from and provides data to other computers connected over a network. Such a client-server network model 30 is shown in FIG. 2. In FIG. 2, a stand-alone server 32 is connected over a network 34 to several client computers 36, 38, 40, 42. The server 32 may be used to store data, programs, etc. for use by the client computers 36, 38, 40, 42. Those skilled in the art will recognize that the server 32 may also be used to manage and control the client computers 36, 38, 40, 42.

Although some computer systems, like the one shown in FIG. 1, have a single microprocessor 12 (such a computer system referred to and known as a "uniprocessor" computer system), other computer systems, like the server 32 shown in FIG. 2, may be formed of multiple microprocessors. FIG. 3 shows such a multiprocessing computer system 50.

The computer system 50 of FIG. 3 is shown as having multiple microprocessors 52, 54, 56, 58. The microprocessors 52, 54, 56, 58 communicate with one another and with a main memory 60 over a network (e.g., a bus) 62. The network 62 is implemented as a set of bits that propagate data in parallel from one location to another. The "bandwidth" of the network 62 (i.e., the number of bits propagated in parallel by the network 62) is an important factor in the overall performance of the computer system 50. FIG. 3 also shows an input/output interface 64 that is connected to the network 62 and serves to input and output data to other portions of the computer system 50 and/or components external to the computer system 50.

Those skilled in the art will recognize that the multiprocessing computer system 50 of FIG. 3 may represent a particular type of multiprocessing computer system used in networking and known and referred to as a symmetric multiprocessing (SMP) computer system. A SMP computer system is one in which multiple microprocessors share, for example, the same memory and input/output interface. Those skilled in the art will also recognize that a SMP computer system may share the same operating system. Although the multiple microprocessors in a SMP computer system share the same resources, each microprocessor may act independently. For example, while one microprocessor searches for data in memory, other microprocessors may update the memory and perform other tasks, thereby increasing the ability of the SMP computer system to handle intensive networking demands.

Those skilled in the art will recognize that SMP computer systems provide good scalability in that additional microprocessors may be added or removed with minimal changes to the system. Despite the benefits of SMP computer systems, bottlenecks may occur when several microprocessors on a board share a single memory bus. Rather than put too many microprocessors on the same SMP board, designers of network elements often distribute applications across a networked cluster of SMP boards, where each board has its own memory, I/O interface, and operating system.

SUMMARY OF INVENTION

According to one aspect of one or more embodiments of the present invention, a computer system comprises: a first integrated circuit; a cache memory having a local cache line with x entries and associated with the first integrated circuit; and a filter point-to-point connected to the first integrated circuit, the filter including a cache memory having a shadow cache line arranged to maintain a copy of the local cache line, where the shadow cache line has more than x entries, and where, in response to a broadcast for requested data by a second integrated circuit, the filter is arranged to relay the broadcast to the first integrated circuit dependent on the shadow cache line.

According to another aspect of one or more embodiments of the present invention, a method of performing computer system operations comprises: issuing a broadcast for requested data to a filter, the filter having a shadow cache line comprising a copy of a local cache line associated with a first integrated circuit point-to-point connected to the filter; if a valid address of the requested data is found in the shadow cache line, relaying the broadcast to the first integrated circuit; and if the first integrated circuit references data not previously cached in the local cache line and removes a previous entry in the local cache line to store the new data, storing a copy of the newly referenced data in the shadow cache line without removing any entries in the shadow cache line.

According to another aspect of one or more embodiments of the present invention, a computer network comprises a cluster of individual SMP computer systems that are connectable using point-to-point interconnect, at least one of the individual SMP computer systems having a filter arranged to maintain a shadow cache line that stores a copy of a local cache lines of an integrated circuit in the at least one of the individual SMP computer systems, where, if the integrated circuit references new data and removes a previous entry in the local cache line to store the new data, the filter is arranged to store a copy of the newly referenced data in the shadow cache line without removing any entries in the shadow cache line.

According to another aspect of one or more embodiments of the present invention, a computer system comprises: a plurality of integrated circuits each having a local cache line; a filter point-to-point connected to the plurality of integrated circuits, the filter having a plurality of shadow cache lines each corresponding to one of the local cache lines; and memory comprising instructions to (i) issue a broadcast for requested data to the filter, (ii) if an address of the requested data is found in one of the shadow cache lines, relay the broadcast to an integrated circuit corresponding to the one of the shadow cache lines, and (iii) and if one of the plurality of integrated circuits references new data and removes a previous entry in a local cache line to store the new data, store a copy of the newly referenced data in a shadow cache line corresponding to the local cache line without removing any entries in the shadow cache line.

Other aspects and advantages of the invention will be apparent from the following description and the appended claims.

DETAILED DESCRIPTION

Figure 1:
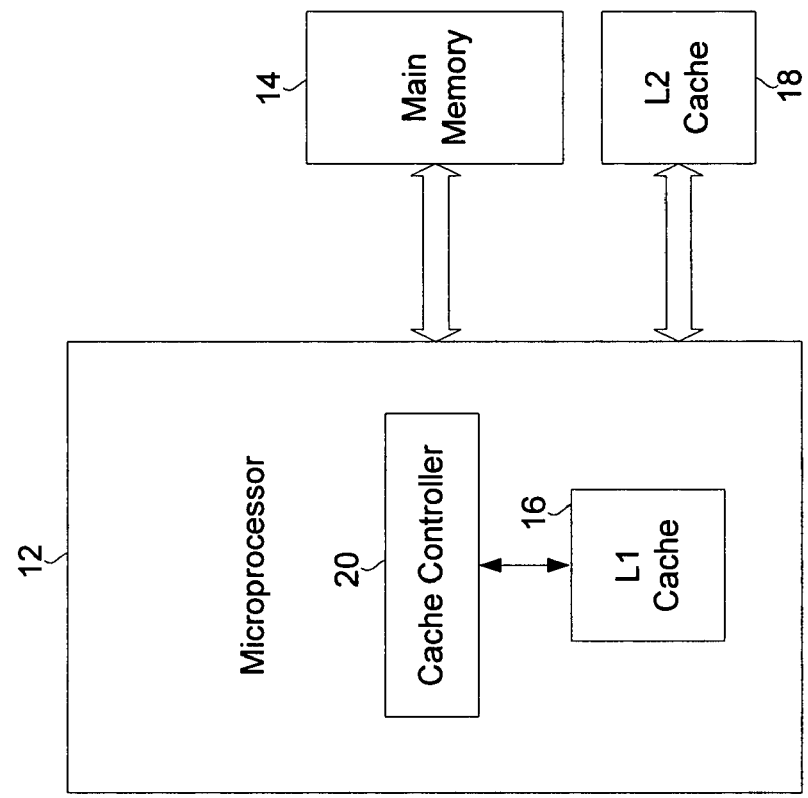
FIG. 1 shows a typical computer system.
Figure 2:
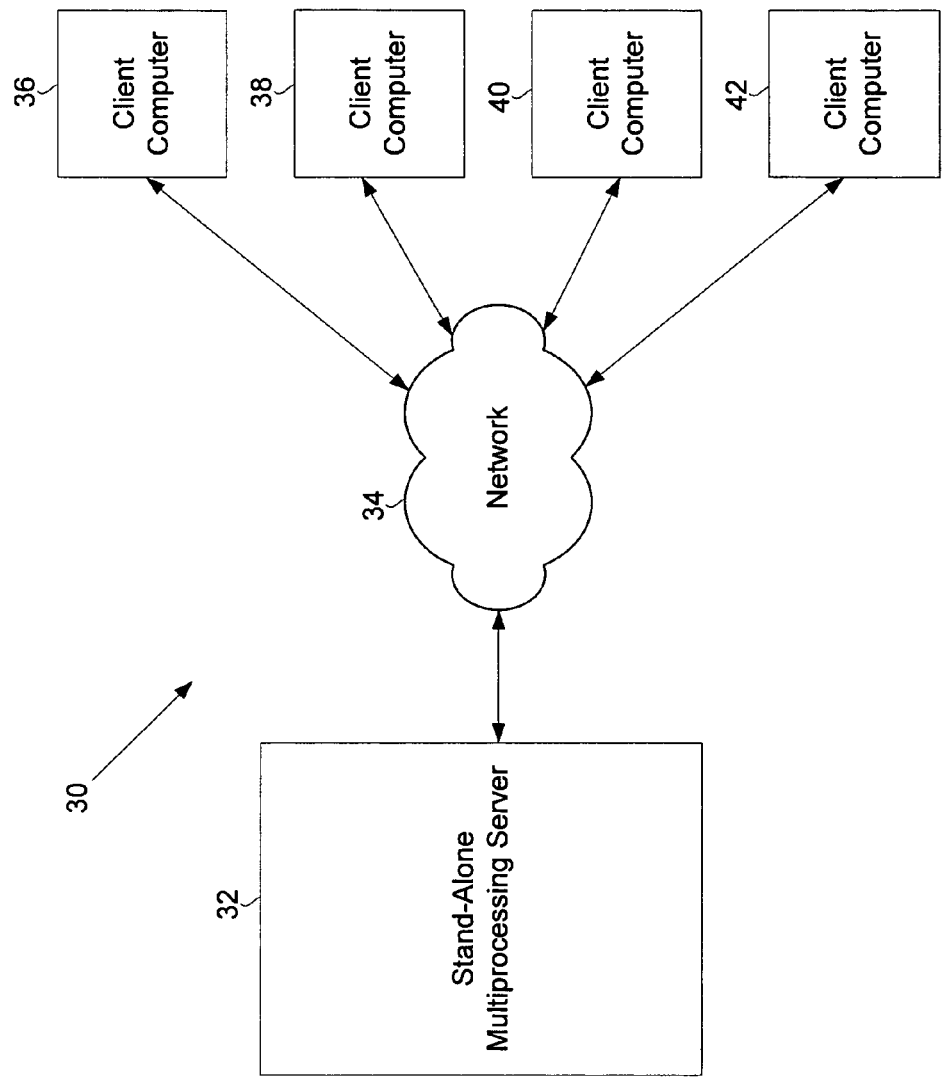
FIG. 2 shows a typical computer network.
Figure 3:
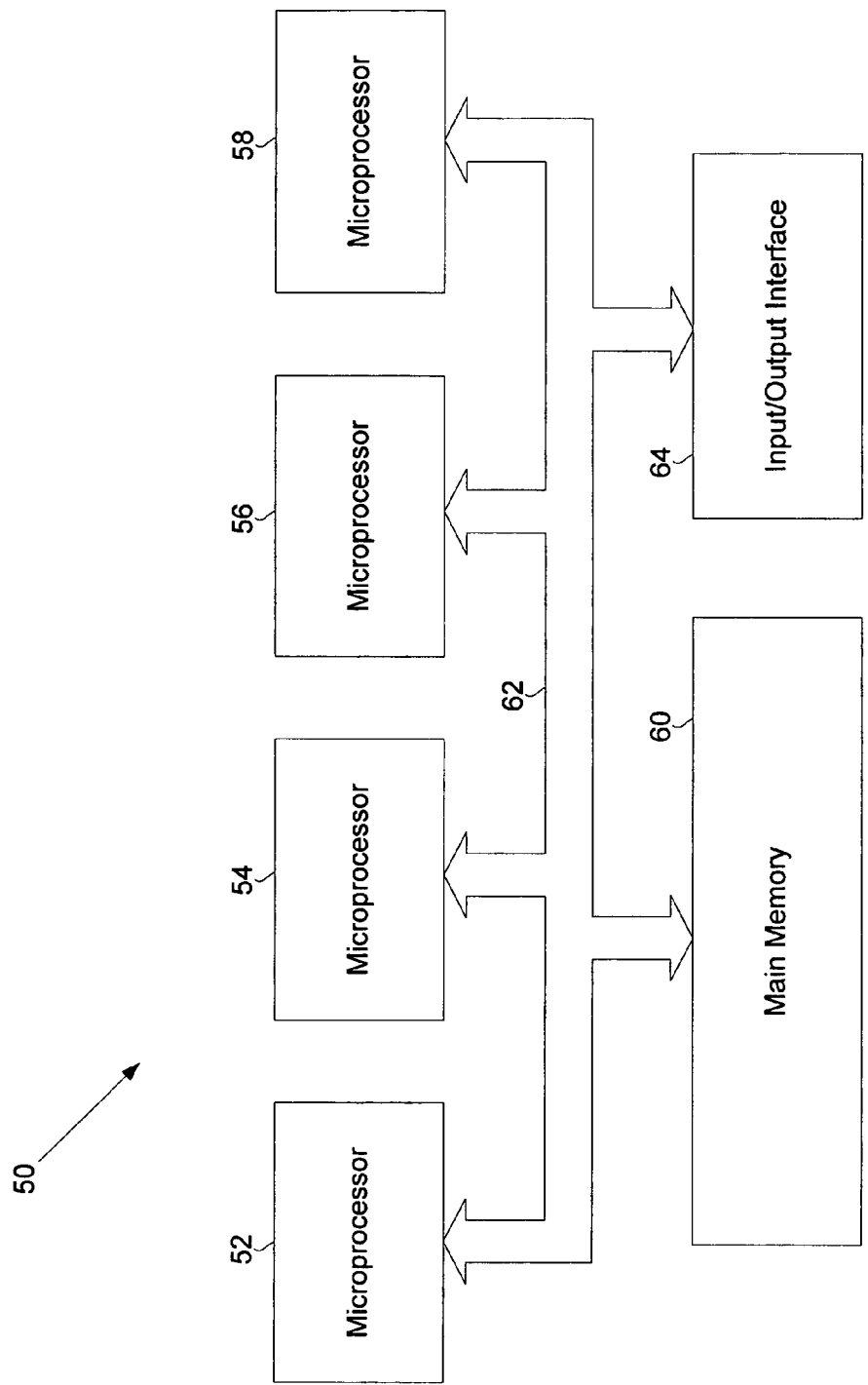
FIG. 3 shows a typical multiprocessor computer system.

In a SMP computer system, such as that shown in FIG. 3, each microprocessor has its own cache memory (see discussion of cache memories above with reference to FIG. 1). Thus, because a particular cache memory data item acted upon by one microprocessor may cause the copy of that data item to differ from other copies of that data item stored in the cache memories of the various microprocessors in a SMP computer system, "cache-coherency" techniques are implemented to ensure that the local cache memory of each microprocessor is consistent with respect to values that are stored in the cache memories of other microprocessors in the SMP computer system.

Cache-coherence problems arise in SMP computer systems when more than one microprocessor cache memory holds a copy of a data item. One type of cache-coherency technique known and referred to as a "snooping" relies on all cache memories to monitor a common network (e.g., a bus) that connects microprocessors to memory. In other words, a snooping-based cache-coherency technique depends on the ability of cache memories to observe every transaction on a network (e.g., a bus) common to the cache memories.

Figure 4:
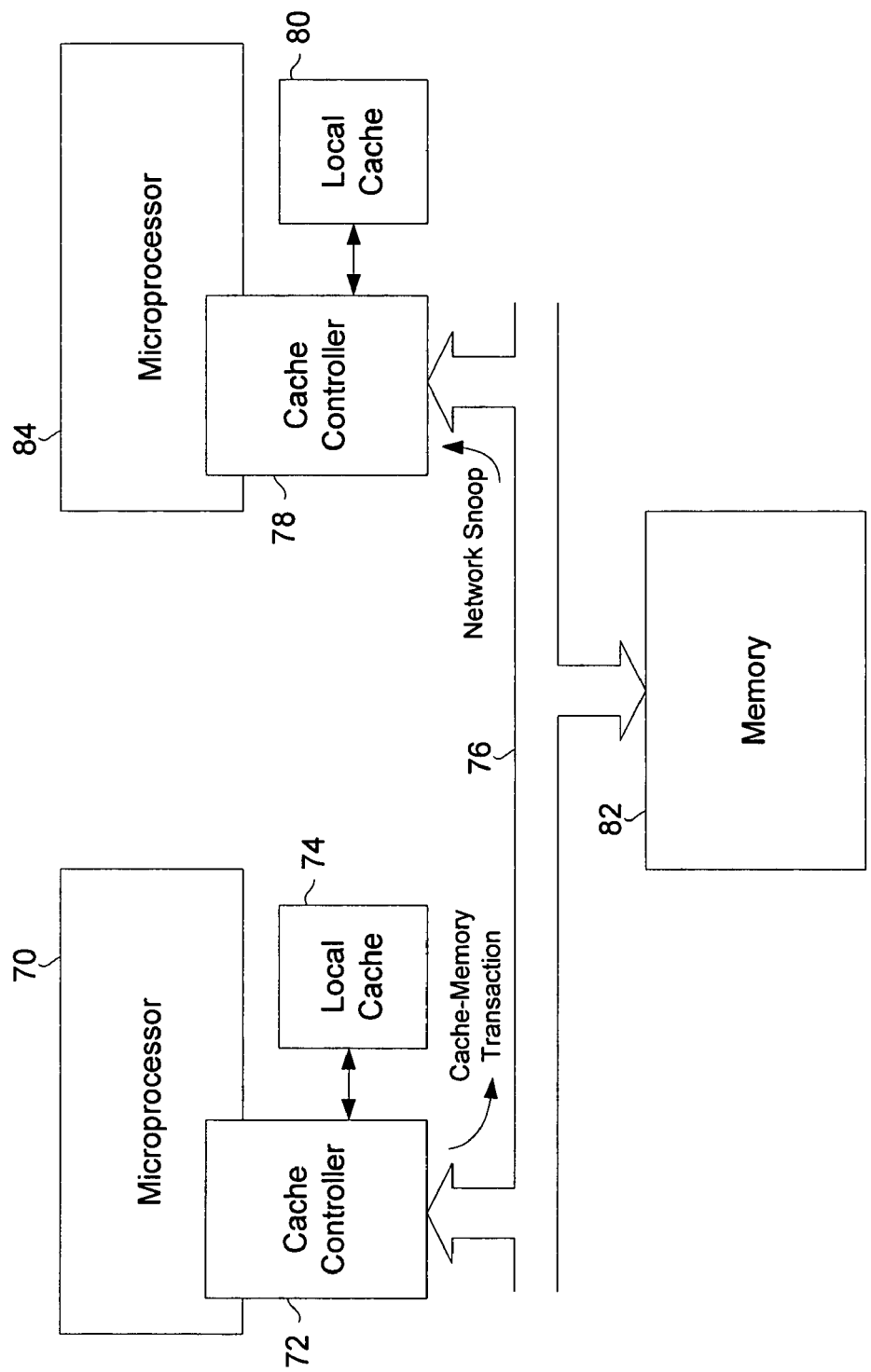
FIG. 4 shows a snooping cache-coherent multiprocessor computer system.

Now referring to FIG. 4, when microprocessor 70 requests data, a cache controller 72 local to microprocessor 70 searches for the requested data in a cache memory 74 local to microprocessor 70. If the requested data is not found in the local cache memory 74, the cache controller 72 broadcasts a data request on a network (e.g., a bus) 76 connected to other cache controllers (e.g., cache controller 78) (others not shown). The cache controllers (e.g., cache controller 78) "snoop" on the network 76 to monitor all transactions on the network 76. If a particular cache memory (e.g., cache memory 80 associated with microprocessor 84) has the data requested by the requesting cache controller 72, the cache controller (e.g., cache controller 78) associated with the cache memory (e.g., cache memory 80) having the requested data forwards (i.e., returns) the requested data to the requesting cache controller 72, which, in turn, updates its associated cache memory 74 with the returned requested data and provides the returned requested data to requesting microprocessor 70. Alternatively, if the requested data is not held in any of the cache memories 74, 80, a copy of the requested data in the main memory 82 is returned to and used by the requesting microprocessor 70.

Further, a cache controller, connected to the network 76 that observes data being written from one cache memory to another may invalidate or update its own copy of that data. The next time the cache controller's microprocessor requests that data, the most recent value of the data is provided to the microprocessor, either because its local cache memory has the most recent value of the data or through obtaining that data by generating a data request on the network 76.

Those skilled in the art will recognize that although a snooping-based cache-coherency technique obtains data relatively quickly (i.e., has relatively low latency), such a technique consumes relatively high bandwidth due to the parallel broadcast nature of its requests. As a result, snooping-based cache-coherency techniques are typically limited to small-scale systems.

Figure 5:
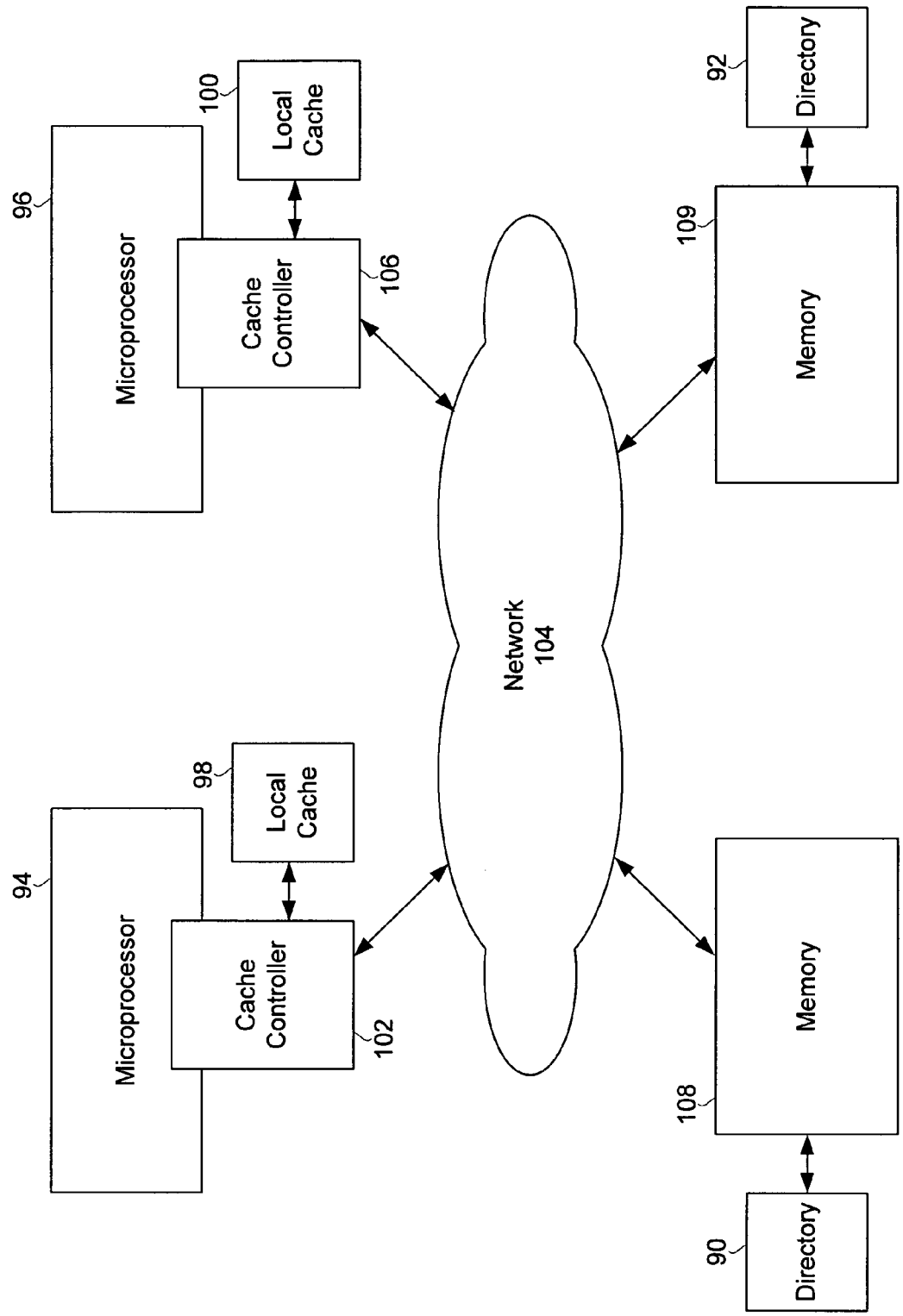
FIG. 5 shows a directory-based cache-coherent multiprocessor computer system.

Now referring to FIG. 5, in another type of cache-coherency technique known and referred to as "directory-based cache-coherence," when a cache miss occurs in a local cache memory (e.g., local cache memory 98 or 100) of a microprocessor (e.g., microprocessor 94 or 96), a cache controller (e.g., cache controller 102 or 106) issues a data request over a network 104 to a "home" directory (e.g., directory 90 or 92) of the requested data, the "home" directory typically being associated with the "home" memory (e.g., memory 108 or 109) of the requested data. The "home" directory may indicate to the cache controller a location of the requested data. Alternatively, if the "home" directory indicates that no other cache memories connected to the network 104 have the requested data, the requested data may be returned by the "home" memory of the requested data.

One advantage of directory-based cache-coherency techniques with respect to snooping-based cache-coherency techniques is that they keep track of which microprocessor nodes have copies of particular data, thereby eliminating the need for a high-bandwidth data request broadcast. This is valuable on read misses because a data request is subsequently satisfied either by the directory indicating the location of a copy of the requested data or by accessing the main memory.

Further, because directory-based cache-coherent techniques may rely on low-bandwidth interconnect rather than on high-bandwidth networks (e.g., buses) that are necessary for broadcasting in snooping-based cache-coherency techniques, directory-based cache-coherent SMP computer systems may be scalable to a large number of microprocessors. However, the indirection overheads associated with directory queries make directory-based cache-coherency techniques slower (i.e., have higher latency) than snooping-based cache-coherency techniques (e.g., a directory-based cache-coherence technique may often require three times the number of "hops" otherwise taken in a snooping-based cache-coherence technique).

For example, in a snooping-based cache-coherency technique, upon a cache miss, one set of parallel messages is broadcast over a bus and one response message with the requested data is sent back to the requesting processing node. On the other hand, in a directory-based cache-coherent technique, upon a cache miss, a data request message is sent to the home processing node, the home processing node forwards the data request message to the owning cache memory, and the owning cache memory returns the requested data to the requesting processing node. Thus, generally, in snooping-based cache-coherency techniques, there are more messages in parallel (relatively low average latency), while in directory-based cache-coherency techniques, there are more messages in series (relatively high average latency).

Often, several small SMP servers (e.g., a near-commodity modular shelf server) are connected together to provide increased processing capabilities. Due to the limited bandwidth of the cables connecting the servers, directory-based cache-coherency techniques are required to ensure cache-coherence among the servers. However, as discussed above, directory-based cache-coherency techniques have relatively high average latency compared to snooping-based cache-coherency techniques.

Figure 6:
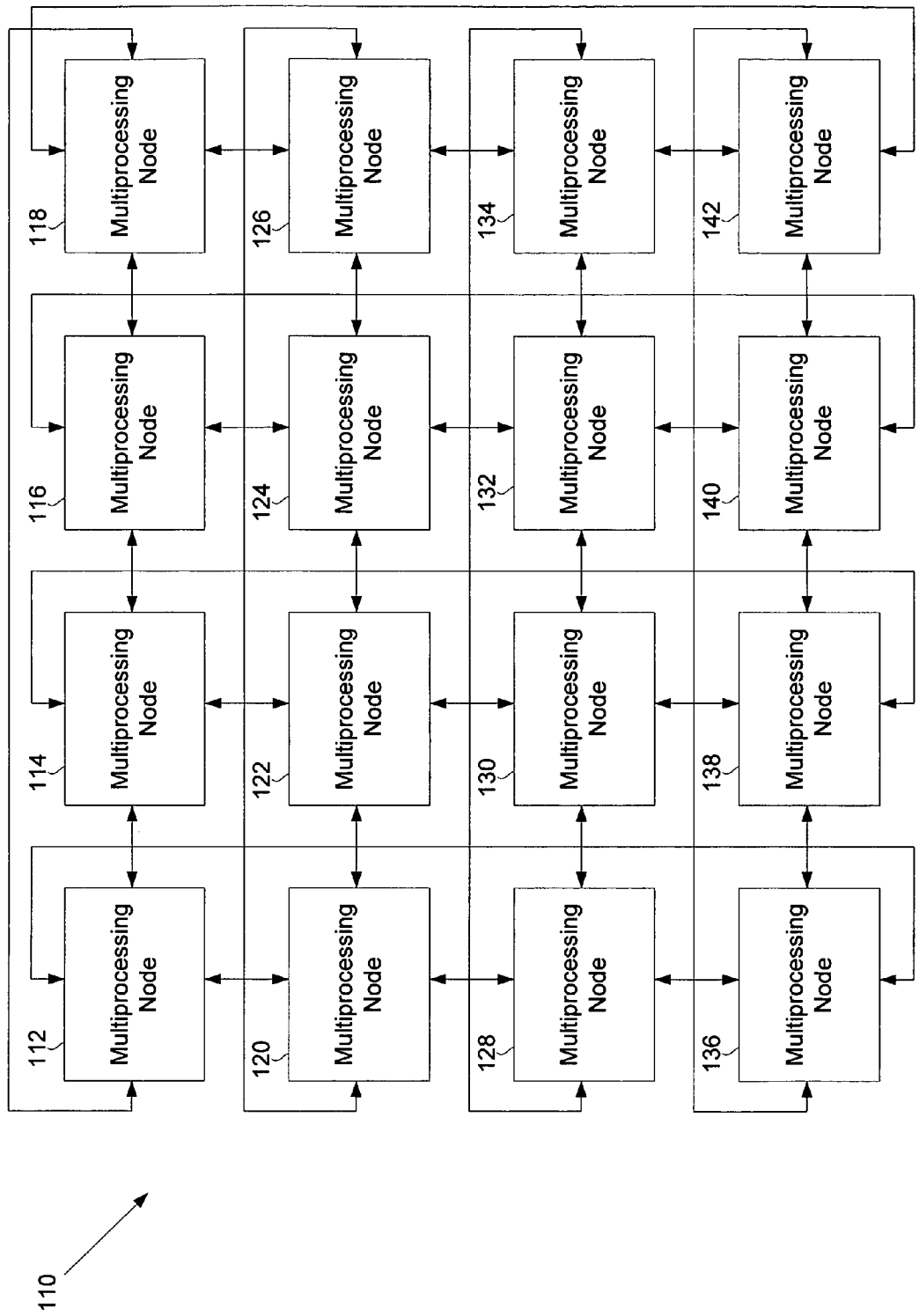
FIG. 6 shows a computer system in accordance with an embodiment of the present invention.

Embodiments of the present invention relate to a technique for performing snooping-based cache-coherency in a point-to-point connected multiprocessing node. FIG. 6 shows an exemplary computer system 110 in accordance with an embodiment of the present invention. In FIG. 6, a plurality of multiprocessing nodes 112, 114, 116, 118, 120, 122, 124, 126, 128, 130, 132, 134, 136, 138, 140, 142 are point-to-point connected using high-bandwidth interconnect (shown but not labeled). Particularly, each multiprocessing node 112, 114, 116, 118, 120, 122, 124, 126, 128, 130, 132, 134, 136, 138, 140, 142 is connected to an adjacent multiprocessing node (in FIG. 6, each peripheral multiprocessing node is shown as being connected to the opposite peripheral multiprocessing node, e.g., multiprocessing node 112 is connected to multiprocessing node 118). In one or more other embodiments of the present invention, a multiprocessing node may be connected to a non-adjacent multiprocessing node. Further, a multiprocessing node is not limited to a server and may be any type of computer system.

In one or more embodiments of the present invention, high-bandwidth interconnect for point-to-point connected multiprocessing nodes may be implemented using interconnect technologies such as, for example, Infiniband or PCI Express. In one or more other embodiments of the present invention, high-bandwidth interconnect used to point-to-point connect multiprocessing nodes may have a bandwidth greater than that of 16-bit 1 GHz interconnect.

Further, in one or more embodiments of the present invention, point-to-point interconnect may be used in cabling a plurality of multiprocessing nodes (e.g., near-commodity shelf servers) together. Moreover, in one or more embodiments of the present invention, point-to-point interconnect may be used to connect a plurality of multiprocessing nodes to a passive backplane.

Figure 7:
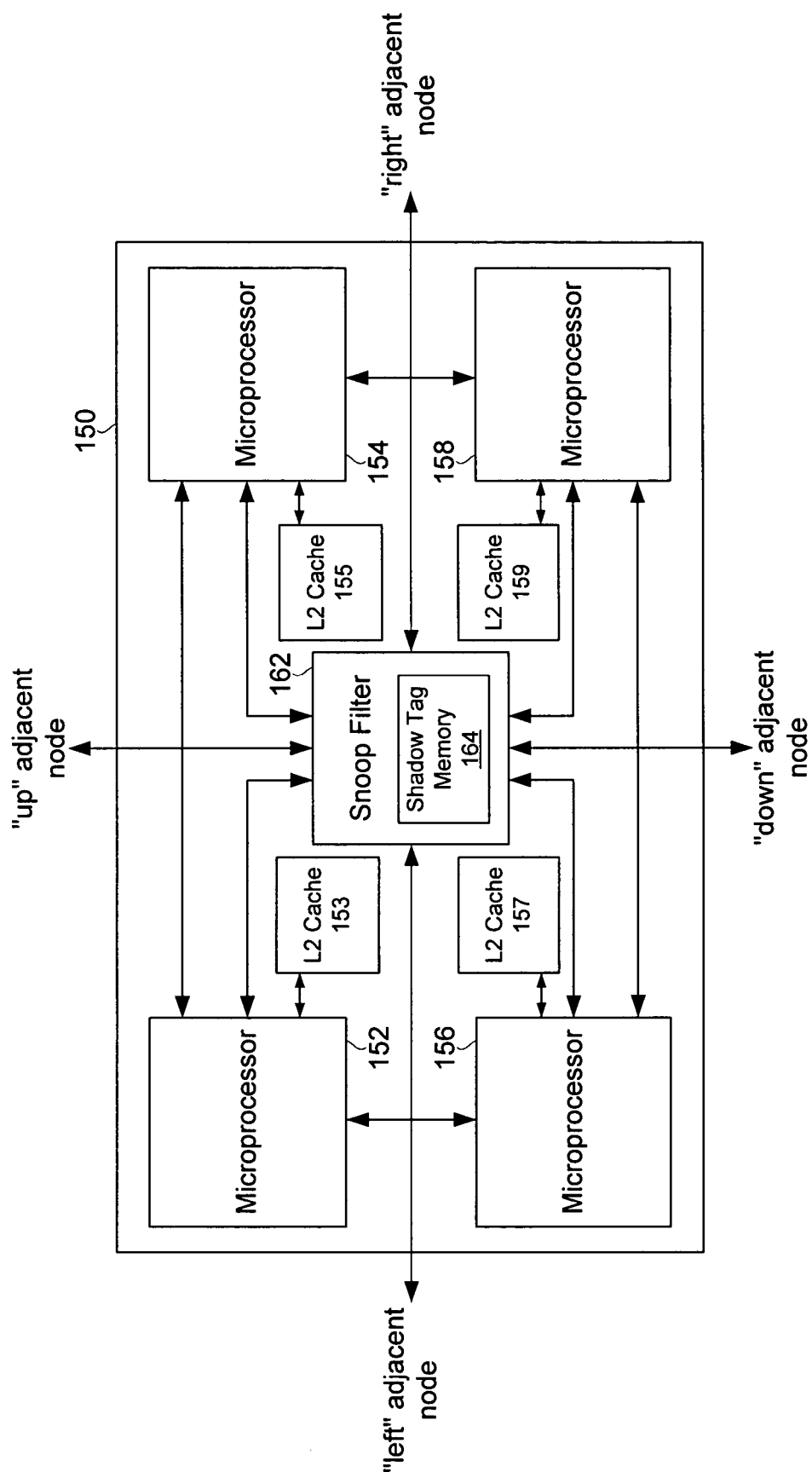
FIG. 7 shows a portion of a computer system in accordance with an embodiment of the present invention.

FIG. 7 shows an exemplary multiprocessing node 150 in accordance with an embodiment of the present invention. In FIG. 7, the multiprocessing node 150 has four microprocessors 152, 154, 156, 158. However, in one or more other embodiments of the present invention, a multiprocessing node may have any number of microprocessors. In FIG. 7, each of the microprocessors 152, 154, 156, 158 is point-to-point connected to a snooping-based cache-coherence filter device (referred to herein also as "snoop filter") 162 via high-bandwidth point-to-point interconnect. The snoop filter 162 may also be connected over high-bandwidth interconnect to one or more snoop filters (not shown) of connected multiprocessing nodes (not shown). Further, each microprocessor 152, 154, 156, 158 may be connected to every other microprocessor 152, 154, 156, 158 in the multiprocessing node 150, for example, chip-to-chip communication. Further, each microprocessor 152, 154, 156, 158 is shown in FIG. 7 as being connected to "off-chip" (e.g., "L2") cache memories 153, 155, 157, 159, respectively.

Further, although the snoop filter 162 in FIG. 7 is shown as being connected to adjacent nodes, in one or more other embodiments of the present invention, a snoop filter may be connected to one or more non-adjacent nodes.

The snoop filter 162 observes snooping-based cache-coherence broadcasts for requested data and the responses thereto. At least partly in order to determine whether to forward or cancel snooping-based cache-coherence broadcasts, the snoop filter 162 has local state memory (referred to and shown in FIG. 7 as "shadow tag memory") 164 that stores the tags corresponding to data stored in the local cache memories (e.g., "L2" cache memories) 153, 155, 157, 159 of each of the microprocessors 152, 154, 156, 158. In other words, the shadow tag memory 164 has a copy of tags corresponding to data stored in each of the local cache memories 153, 155, 157, 159. In one or more embodiments of the present invention, the shadow tag memory is greater than 32 MB.

Using the shadow tag memory 164, the snoop filter 162 forwards a received broadcast for requested data (by one of the microprocessors 152, 154, 156, 158 or from another multiprocessing node (not shown)) to a particular one of the microprocessors 152, 154, 156, 158 only if its shadow tag memory 164 indicates that the particular microprocessor has a copy of the requested data. Otherwise, if the snoop filter 162 determines that none of the microprocessors 152, 154, 156, 158 has a copy of the requested data, the snoop filter 162 is configured to cancel any subsequent relays of the broadcast to the microprocessors 152, 154, 156, 158, and instead, sends a message back to the requesting microprocessor (or connected multiprocessing node (not shown)) indicating that none of the other microprocessors (or none of the microprocessors) in the multiprocessing node 150 has a copy of the requested data.

Figure 8:
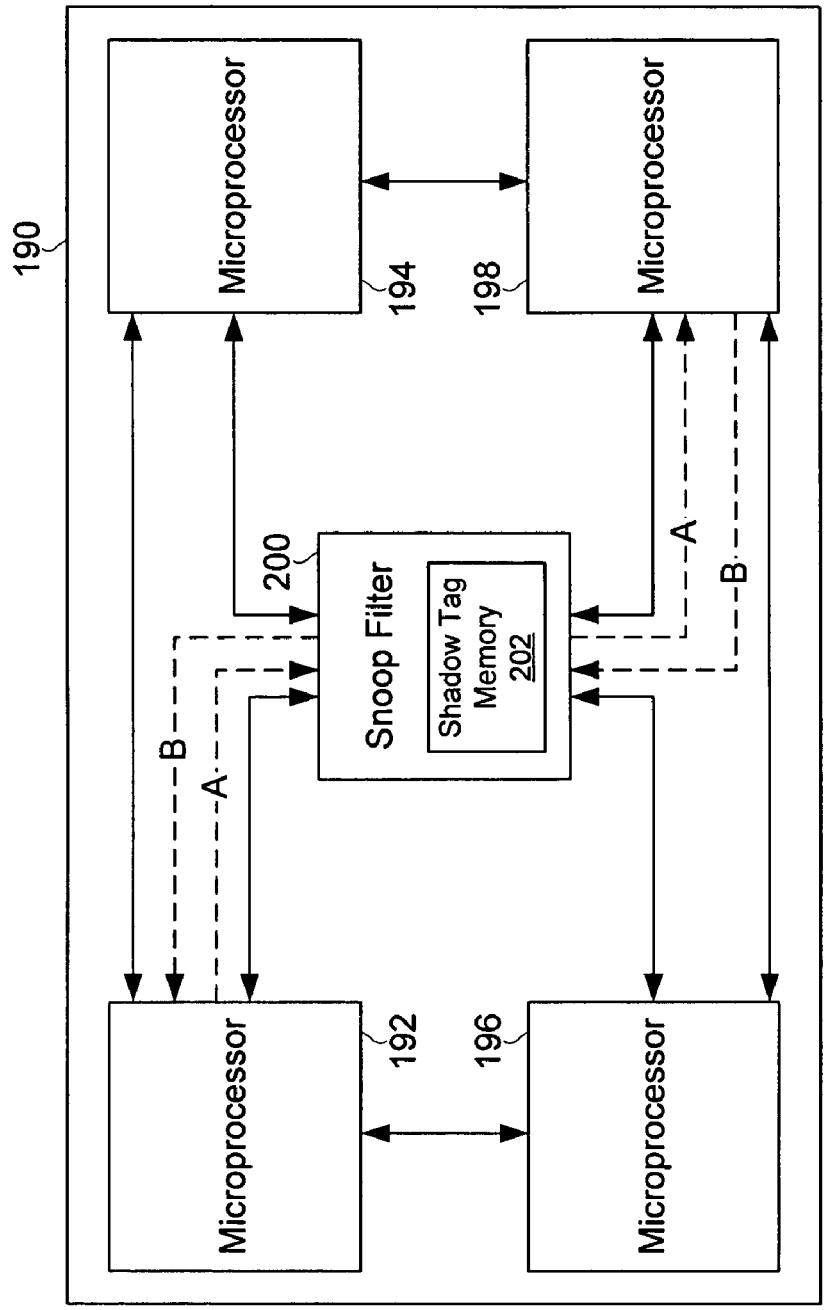
FIG. 8 shows an exemplary flow of messages in a portion of a computer system in accordance with an embodiment of the present invention.

By using a snoop filter in accordance with one or more embodiments of the present invention, requests for data are sent only to those processing nodes having copies of the requested data. For example, FIG. 8 shows an exemplary flow of messages in a multiprocessing node 190 in accordance with an embodiment of the present invention.

The multiprocessing node 190 is shown as having a snoop filter 200 that is connected via high-bandwidth interconnect (shown, but not labeled) to microprocessors 192, 194, 196, 198. In FIG. 8, microprocessor 192 ("the requesting microprocessor") issues a broadcast A for requested data. Due to the presence of the snoop filter 200, broadcast A is first routed to the snoop filter 200. Referencing its shadow tag memory 202, the snoop filter 200 determines whether any of microprocessors 194, 196, 198 have a copy of the data requested in broadcast A. In the exemplary case shown in FIG. 8, the snoop filter 200, referencing its shadow tag memory 202, determines that microprocessor 198 has a copy of the data requested in broadcast A, and thus, the snoop filter 200 forwards broadcast A to microprocessor 198. In response to broadcast A being forwarded to microprocessor 198, microprocessor 198 issues a response B (having a copy of the requested data) that is forwarded back to the requesting microprocessor 192 through the snoop filter 200. By forwarding response B through the snoop filter 200, the snoop filter 200 is able to update its shadow tag memory 202.

In order to maintain desirable operation, it is important to maintain inclusion of the tags of the local cache memories (e.g., "L2" cache memories) in the shadow tag memory. In one or more embodiments of the present invention, the shadow tag memory and the local cache memories may be maintained as set-associative cache memories.

Those skilled in the art will recognize that in a set-associative cache memory, the cache memory is grouped into sets that each contain n cache lines. Each memory address is assigned a set (also referred to as "cache line") and can be cached in any one of the n locations within the set that the address is assigned. For example, in a 4-way set-associative cache, a memory address is assigned a set and can be cached in any one of 4 entries within the set the address is assigned.

Figure 9:
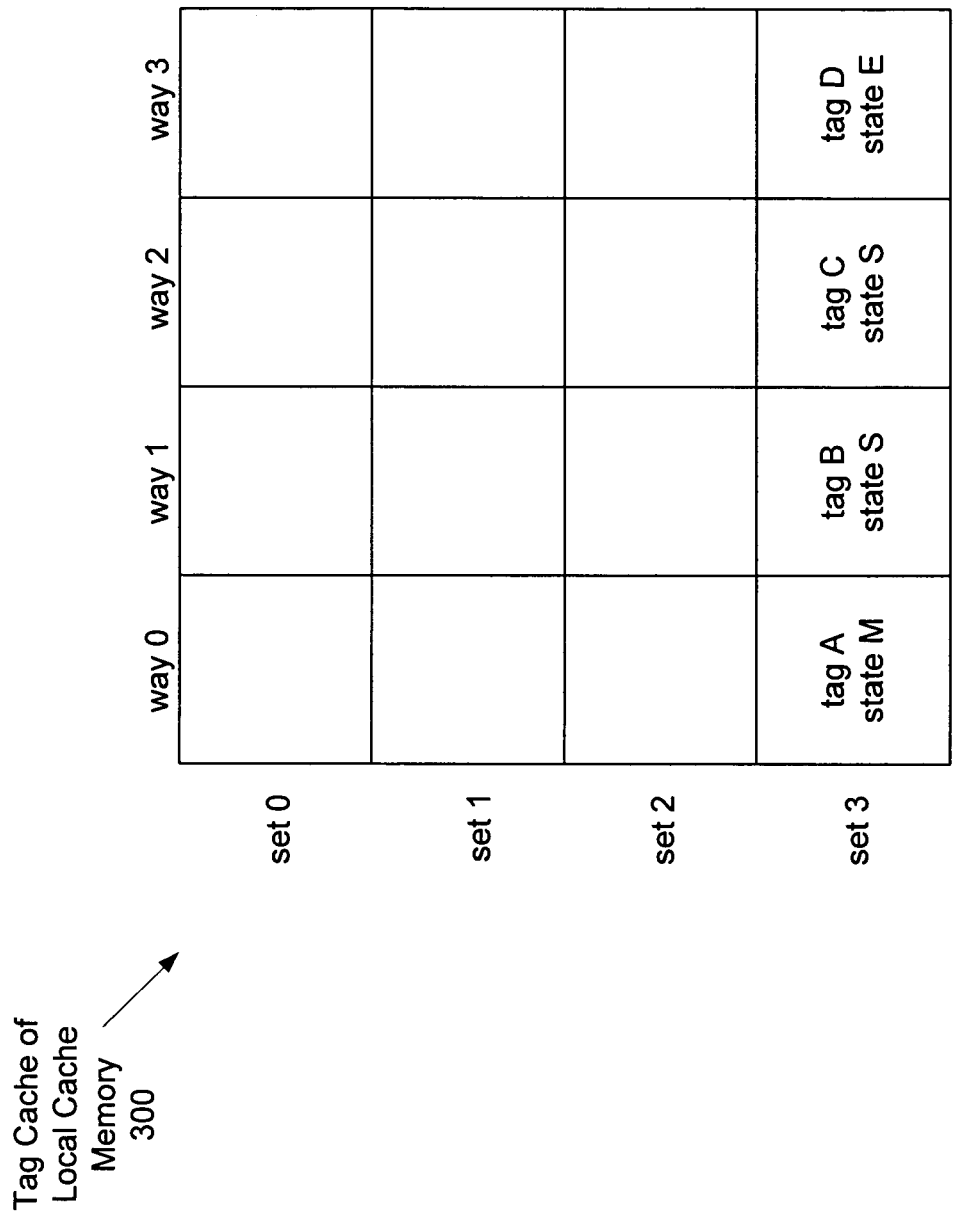
FIG. 9 shows an exemplary local cache memory in accordance with an embodiment of the present invention.

FIG. 9 shows an exemplary implementation of a set-associative cache memory 300 that may represent one of the local cache memories (e.g., L2 cache memory 153 in FIG. 7) in a point-to-point connected multiprocessing node. Particularly, cache memory 300 is shown as being a 4-way set-associative cache memory. Cache memory 300 caches the tags of cached data of the microprocessor to which cache memory 300 belongs. Thus, when the microprocessor requests data, the microprocessor references cache memory 300 to determine whether there is a local copy of the requested data. Otherwise, the microprocessor may have to issue a broadcast for the requested data.

Figure 10:
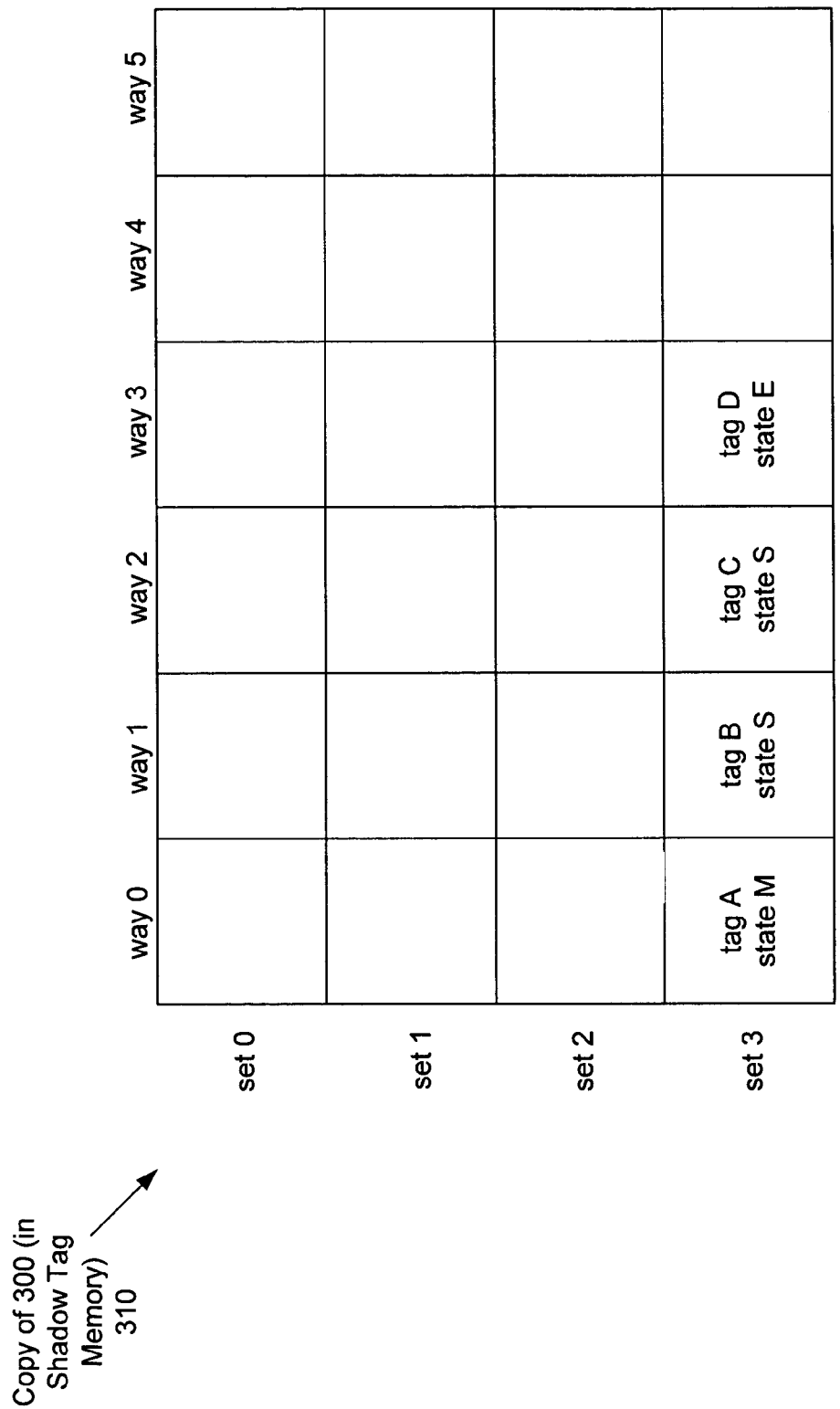
FIG. 10 shows an exemplary portion of a shadow tag memory in accordance with an embodiment of the present invention.

As discussed above, a snoop filter in a point-to-point connected multiprocessing node has a shadow tag memory that holds copies of the tag caches of each of the microprocessors connected to the snoop filter. Accordingly, FIG. 10 shows a cache memory 310 (of a shadow tag memory) that is associated with the cache memory 300 shown in FIG. 9. As shown in FIGS. 9 and 10, cache memory 310 of the shadow tag memory stores copies of the tags (along with state information) cached in the cache memory 300. Further, cache memory 310 has additional ways, a purpose of which is discussed below.

Those skilled in the art will note that in one or more other embodiments of the present invention, a cache memory may be maintained with a different associativity than that shown in FIGS. 9 and 10.

As shown in FIGS. 9 and 10, tags are cached along with state information. In one or more embodiment of the present invention, state information may be implemented using a MOESI (modified-owned-exclusive-shared-invalid) cache-coherency protocol. The MOESI cache-coherency uses several states to track data. These states include "invalid" (I), "shared" (S), "exclusive" (E), "modified" (M), and "owned" (O) states. The invalid (I) state indicates that the cache line does not contain valid data. The shared (S) state indicates that other cache memories have this cache line. The exclusive (E) state indicates that no other cache memory has this cache line. The modified (M) state indicates that the cache line was modified, and thus, the underlying data is no longer valid. The owned (O) state indicates that a particular cache has the responsibility of updating main memory. Using such a MOESI cache-coherency protocol, cached entries may change state depending on whether a microprocessor (e.g., 152 in FIG. 7) connected to a snoop filter in a multiprocessing node reads, stores, and/or modifies data stored in its local cache memory (e.g., 153 in FIG. 7) or the local cache memories (e.g., 155, 157, 159 in FIG. 7) of other microprocessors (e.g., 154, 156, 158) also connected to the snoop filter.

In one or more embodiments of the present invention, one or more different cache-coherency protocols may be used (e.g., a MSI (modified-shared-invalid) protocol or a MESI (modified-exclusive-shared-invalid) protocol).

The state information of the cached entries in a shadow tag memory of a snoop filter may be used by the snoop filter to determine whether to cancel or relay particular broadcasts for requested data to particular processing nodes. For example, if a snoop filter, in response to observing a broadcast for requested data, finds (using its shadow tag memory) that a copy of the requested data in a local cache memory of a particular microprocessor has an invalid state, the snoop filter cancels the relay of the broadcast to that particular microprocessor.

Figure 11:
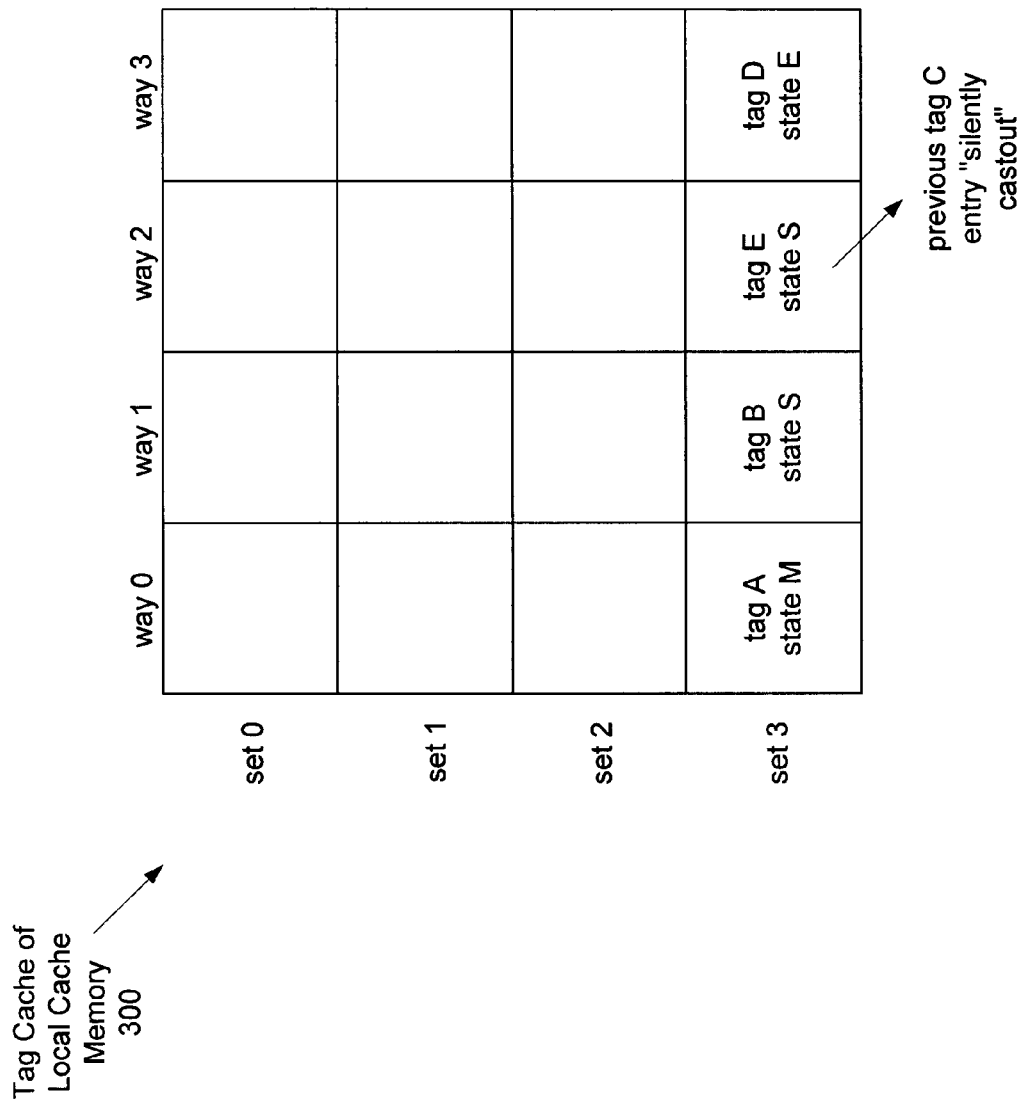
FIG. 11 shows an exemplary local cache memory in accordance with an embodiment of the present invention.

As broadcasts for requested data and the responses thereto propagate to and through the snoop filter, the snoop filter is able to update its shadow tag memory accordingly. Further, as data is transferred and referenced by a local cache memory, the local cache memory is accordingly updated. In some cases, however, updates to a local cache memory may not propagate through the snoop filter. For example, referring to the cache memory 300 shown in FIG. 9, if the microprocessor (e.g., 152 in FIG. 7) to which cache memory 300 is local references tag E (state S), an entry in the cache memory 300 (e.g., tag C) may be "silently castout" (i.e., without notice to the snoop filter) to provide a memory location for tag E. In this case, cache memory 300 is maintained as shown in FIG. 11.

Figure 12:
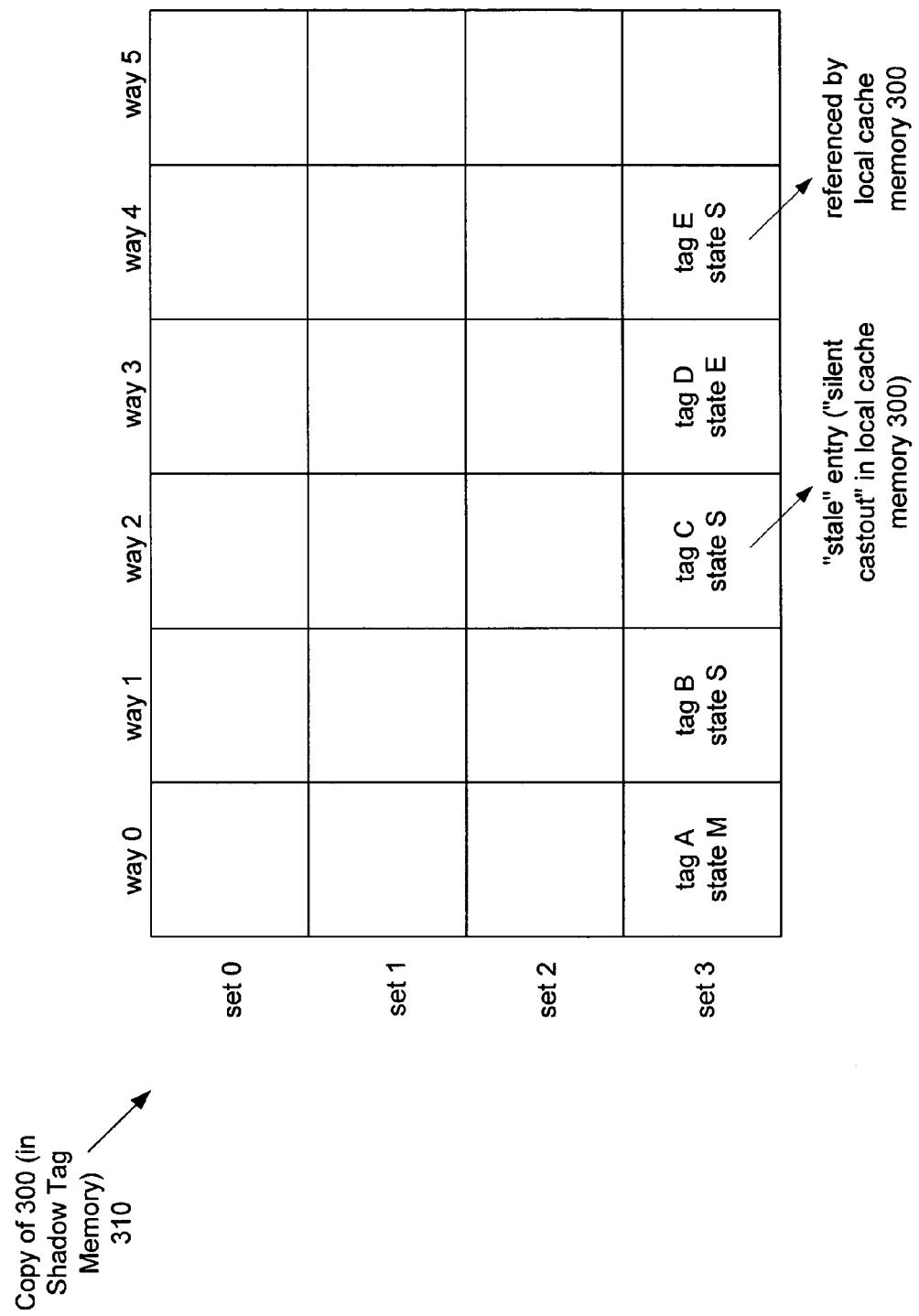
FIG. 12 shows an exemplary portion of a shadow tag memory in accordance with an embodiment of the present invention.

Still referring to the case in which cache memory 300 references tag E and tag C is "silently castout," the copy of cache memory 300 in the shadow tag memory 310 is maintained as shown in FIG. 12. As is shown in FIG. 12, tag C is not removed because the "castout" of tag C in cache memory 300 occurred locally and did not reference the shadow tag memory 310. In other words, because the snoop filter is "unaware" that tag C was "castout" in the cache memory 300, the copy of the cache memory 300 in the snoop filter's shadow tag memory 310 retains tag C even though tag C in the cache memory 300 was replaced. However, because a copy of the cache memory 300 in the shadow tag memory 310 has an increased set-associativity (i.e., has additional "way" columns), the reference of tag E by the cache memory 300 (which is known to the snoop filter) is duplicated in the copy of the cache memory 300 in the shadow tag memory 310 by storing tag E into one of the additional "way" columns.

Noting that a "stale" entry in a copy of a local cache line in a corresponding shadow cache line (e.g., tag C in shadow tag memory 310 in FIG. 12) will eventually be removed as a request for data associated with tag C results in a cache miss, the copy of the local cache line in the shadow cache line is "over-provisioned" with memory locations so that references to previously uncached tags may be added to shadow cache line even if the shadow cache line contains "stale" entries. In such a manner, the support of a duplicate tag cache in the shadow tag memory is referred to as being "conservative."

It is noted that without such increased set-associativity, a shadow cache line containing "stale" entries may appear full, thereby requiring a process to invalidate one or more entries for subsequent allocation of a new entry. Stale entries may be reclaimed by observing snoop responses downstream of the snoop filter associated with the directory. In such a case, stale entries may be reclaimed when the snoop responses coming from downstream of the snoop filter associated with the directory are negative.

Those skilled in the art will note that the amount of additional cache line locations provided in a copy of a local cache line maintained in a shadow tag memory of a snoop filter may be determined based on system analysis and optimization.

Advantages of the present invention may include one or more of the following. In one or more embodiments of the present invention, copies of local tag cache memories may be used in a point-to-point connected multiprocessing node to improve system performance.

In one or more embodiments of the present invention, a point-to-point connected multiprocessing node is provided with conservative shadow cache support having copies of local cache memories, thereby improving system performance.

In one or more embodiments of the present invention, a snoop filter using a shadow tag memory may improve the latency of multiprocessing nodes that are point-to point connected together to behave as a SMP computer system by selectively canceling and forwarding relays of broadcasts for requested data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
    a plurality of multiprocessing nodes, each of the plurality of multiprocessing nodes comprising:
        a first processor;
        a first cache memory external to and associated with the first processor having a local cache line with a number of entries; and
        a filter point-to-point connected to the first processor, the filter including a cache memory having a shadow cache line arranged to maintain at least one tag corresponding to data stored in the local cache line,
        wherein the shadow cache line has more entries allocated for the local cache line than are in the local cache line,
        wherein, the filter forwards a received broadcast for requested data from a requesting processor to the first processor dependent on the shadow cache line when the shadow cache line contains a tag corresponding to the requested data,
        wherein the filter sends a message to the requesting processor indicating that no other processor in the computer system includes a copy of the requested data when the shadow cache line does not contain the tag corresponding to the requested data; and
        wherein the filter removes one of the at least one tag from the shadow cache line when a local cache line miss occurs resulting from referencing the one of the at least one tag.

2. The computer system of claim 1, wherein the requesting processor is point-to-point connected to the filter.

3. The computer system of claim 1, wherein if the first processor references data not previously cached in the local cache line, the filter stores a new tag corresponding to the data not previously cached in the local cache line in the shadow cache line even if a tag corresponding to an entry removed from the local cache line remains in the shadow cache line.

4. The computer system of claim 1, wherein the filter cancels a broadcast for the requested data subsequent to the received broadcast for the requested data from the requesting processor when the shadow cache line does not contain the tag corresponding to the requested data.

5. The computer system of claim 1, wherein at least one of the cache memory associated with the first processor and the cache memory of the filter is maintained as a set-associative cache memory.

6. The computer system of claim 1, wherein the cache memory associated with the first processor is maintained using at least one of a MOESI, a MSI and a MESI cache-coherency protocol.

7. A method of performing computer system operations, comprising:
    issuing a broadcast for requested data from a requesting processor to a filter, the filter having a shadow cache line comprising at least one tag corresponding to data stored in a local cache line associated with a first processor point-to-point connected to the filter;
    transferring the broadcast for requested data from the requesting processor to the first processor dependent on the shadow cache line when one of the at least one tag corresponds to the requested data;
    sending a message to the requesting processor indicating that no other processor in the computer system includes a copy of the requested data when no tags in the shadow cache line correspond to the requested data;
    storing a new tag corresponding to newly referenced data in the shadow cache line without removing any tags from the shadow cache line when the first processor references data not previously cached in the local cache line and removes a previous entry in the local cache line to store the new data; and
    removing the one of the at least one tag from the shadow cache line when a local cache line miss occurs resulting from transferring the broadcast for requested data from the requesting processor to the first processor.

8. The method of claim 7, further comprising:
    using at least one of a MSI a MESI, and a MOESI cache-coherency protocol to update the local cache line.

9. The method of claim 7, wherein the shadow cache line has more cache line entries allocated for the local cache line than are in the local cache line.

10. The method of claim 7, wherein at least one of the local cache line and the shadow cache line is maintained as a set-associative cache memory.

11. A computer network, comprising:
    a cluster of individual SMP computer systems that are connectable using point-to-point interconnect, at least one of the individual SMP computer systems having a filter arranged to maintain a shadow cache line that stores at least one tag corresponding to data stored in a local cache line of a first processor in the at least one of the individual SMP computer systems, wherein, when the first processor references new data and removes a previous entry from the local cache line to store the new data, the filter stores a new tag corresponding to the newly referenced data in the shadow cache line without removing any tags from the shadow cache line; and wherein the filter removes one of the at least one tag from the shadow cache line when a local cache line miss occurs resulting from referencing the one of the at least one tag.

12. The computer network of claim 11, wherein the local cache line is maintained using at least one of a MSI, MESI, and a MOESI cache-coherence protocol.

13. The computer network of claim 11, wherein the shadow cache line has more cache line entries allocated for the local cache line than are in the local cache line.

14. The computer network of claim 11, wherein, in response to a broadcast for requested data, the filter is configured to relay the broadcast to the processor dependent on the shadow cache line.

15. The computer network of claim 11, wherein at least one of the local cache line and the shared cache line is maintained as a set-associative cache memory.

16. The computer network of claim 11, wherein the shadow cache line has an increased set-associativity with respect to that of the local cache line.

17. A computer system, comprising:
a plurality of processors each having a local cache line;
a filter point-to-point connected to each of the plurality of processors, the filter having a plurality of shadow cache lines each corresponding to one of the local cache lines; and
memory comprising instructions to:
issue a broadcast for requested data from a requesting processor to the filter,
forward the broadcast for requested data to a first processor corresponding to the one of the shadow cache lines when a tag corresponding to an address of the requested data is found in one of the shadow cache lines,
store a new tag corresponding to newly referenced data in a shadow cache line corresponding to the local cache line without removing any entries in the shadow cache line when one of the plurality of processors references new data and removes a previous entry from a local cache line to store the new data; and
remove a tag from one of the shadow cache lines when a local cache line miss occurs resulting from forwarding the broadcast for requested data from the requesting processor to the first processor.

18. The computer system of claim 17, wherein the local cache lines are maintained using at least one of a MOESI, a MSI, and a MESI cache-coherency protocol.

19. The computer system of claim 17, wherein one of the plurality of shadow cache lines comprises more entries allocated for a local cache line than the local cache line corresponding to the one of the plurality of shadow cache lines.

20. The computer system of claim 17, wherein at least one of the plurality of shadow cache lines and the local cache lines is maintained as a set-associative cache memory.

* * * * *